United States Patent
Chen

(10) Patent No.: US 6,182,544 B1
(45) Date of Patent: Feb. 6, 2001

(54) STEPLESS CUTTER FEEDING MECHANISM FOR A LATHE

(76) Inventor: Shih-Ho Chen, P.O. Box 63-247, Taichung (TW)

( * ) Notice: Under 35 U.S.C. 154(b), the term of this patent shall be extended for 0 days.

(21) Appl. No.: 09/342,192

(22) Filed: Jun. 29, 1999

(51) Int. Cl.[7] .................................................. B23B 19/02
(52) U.S. Cl. ............................. 82/144; 82/145; 82/147
(58) Field of Search ........................... 82/144, 142, 143, 82/145, 147, 118, 119

(56) References Cited

U.S. PATENT DOCUMENTS

| | | | |
|---|---|---|---|
| 2,600,988 | * | 6/1952 | Greene et al. ............... 82/144 X |
| 2,897,427 | * | 7/1959 | Bradburn, Jr. ............... 82/144 X |
| 3,008,071 | * | 11/1961 | Karger ......................... 82/144 X |
| 3,543,615 | * | 12/1970 | Cudnohufsky ............... 82/144 X |
| 3,976,861 | * | 8/1976 | Edwards et al. ............. 82/144 X |
| 4,274,315 | * | 6/1981 | Varner ......................... 82/144 X |

FOREIGN PATENT DOCUMENTS

2924890 * 1/1980 (DE) .................................. 82/144

* cited by examiner

*Primary Examiner*—Henry Tsai
(74) *Attorney, Agent, or Firm*—Rosenberg, Klein & Lee

(57) ABSTRACT

A lathe is provided with a stepless cutter feeding mechanism for cutting a workpiece at a constant linear cutting speed. The lathe includes a cutter seat that carries a cutter for cutting the workpiece and a motor for driving a main shaft that carries the workpiece. The stepless cutter feeding mechanism comprises a speed sensing device connected to the cutter for sensing linear cutting speed of the cutter. A governor device is connected to the speed sensing device and electrically connected to the motor for changing rotational speed of the motor in response to a linear cutter feeding speed of the cutter such that the cutter cuts the workpiece at a constant linear cutting speed.

3 Claims, 7 Drawing Sheets

STEPLESS CUTTER FEEDING MECHANISM FOR A LATHE

BACKGROUND OF THE INVENTION

1. Field of the Invention

The present invention relates to a stepless cutter feeding mechanism for a lathe to cut a workpiece at a constant linear cutting speed to thereby provide a product of good quality.

2. Description of the Related Art

A typical lathe for cutting, a workpiece (e.g., a shaft) generally includes a cutter feeding device that feeds a cutter transversely to process the shaft. It is known to keep the linear cutting speed during cutting of the workpiece so as to obtain a product of good quality. FIG. 8 of the drawings illustrates a typical cutting of a shaft 50 by a cutter 60 that is transversely fed at a constant speed. The linear cutting speed (the peripheral displacement per minute of the cutter along a circumference of the workpiece) is V1 when the shaft 50 is rotated through an angle Θ. Nevertheless, referring to FIG. 9, when the diameter D of the shaft 50 becomes smaller as a result of cutting, the linear cutting speed V2 is smaller than V1. Thus, the linear cutting speed for the shaft 50 is not constant such that the resultant shaft 50 has a poor quality.

The present invention is intended to provide a buckle device that mitigates and/or obviate the above problem.

SUMMARY OF THE INVENTION

It is a primary object of the present invention to provide a stepless cutter feeding mechanism for a lathe to cut a workpiece at a constant linear cutting speed to thereby provide a product of good quality.

The rotating speed of the workpiece to be processed and the speed of the cutter are both increased when the diameter of the workpiece becomes smaller, thereby keeping the linear cutting speed at a constant value.

In accordance with the present invention, a lathe is provided with a stepless cutter feeding mechanism for cutting a workpiece at a constant linear cutting speed. The lathe includes a cutter seat that carries a cutter for cutting the workpiece and a motor for driving a main shaft that carries the workpiece. The stepless cutter feeding mechanism comprises a speed sensing means connected to the cutter for sensing linear cutting speed of the cutter. A governor device is connected to the speed sensing means and electrically connected to the motor for changing rotational speed of the motor in response to a linear cutter feeding speed of the cutter such that the cutter cuts the workpiece at a constant linear cutting speed.

The lathe includes a transverse feeding shaft to which the cutter seat is mounted for feeding the cutter along a transverse direction. In an embodiment of the invention, the speed sensing means includes a worm and a worm gear meshed with the worm. The worm is meshed with the transverse feeding shaft and the worm gear is connected to the governor device. The worm includes an axial receptacle. A screw is securely mounted in the axial receptacle to move therewith and meshes with the transverse feeding shaft. The governor device includes a governor coaxially mounted with the worm gear and a resistor means connected between the governor and the motor. The resistor means changes rotational speed of the motor in response to the change in the linear cutting speed of the cutter.

The lathe further comprises a switch device that includes a manual mode and an automatic mode thereby allowing adjustment in rotational speed of the main shaft by means of manual operation and by automatic operation under control of the governor device.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
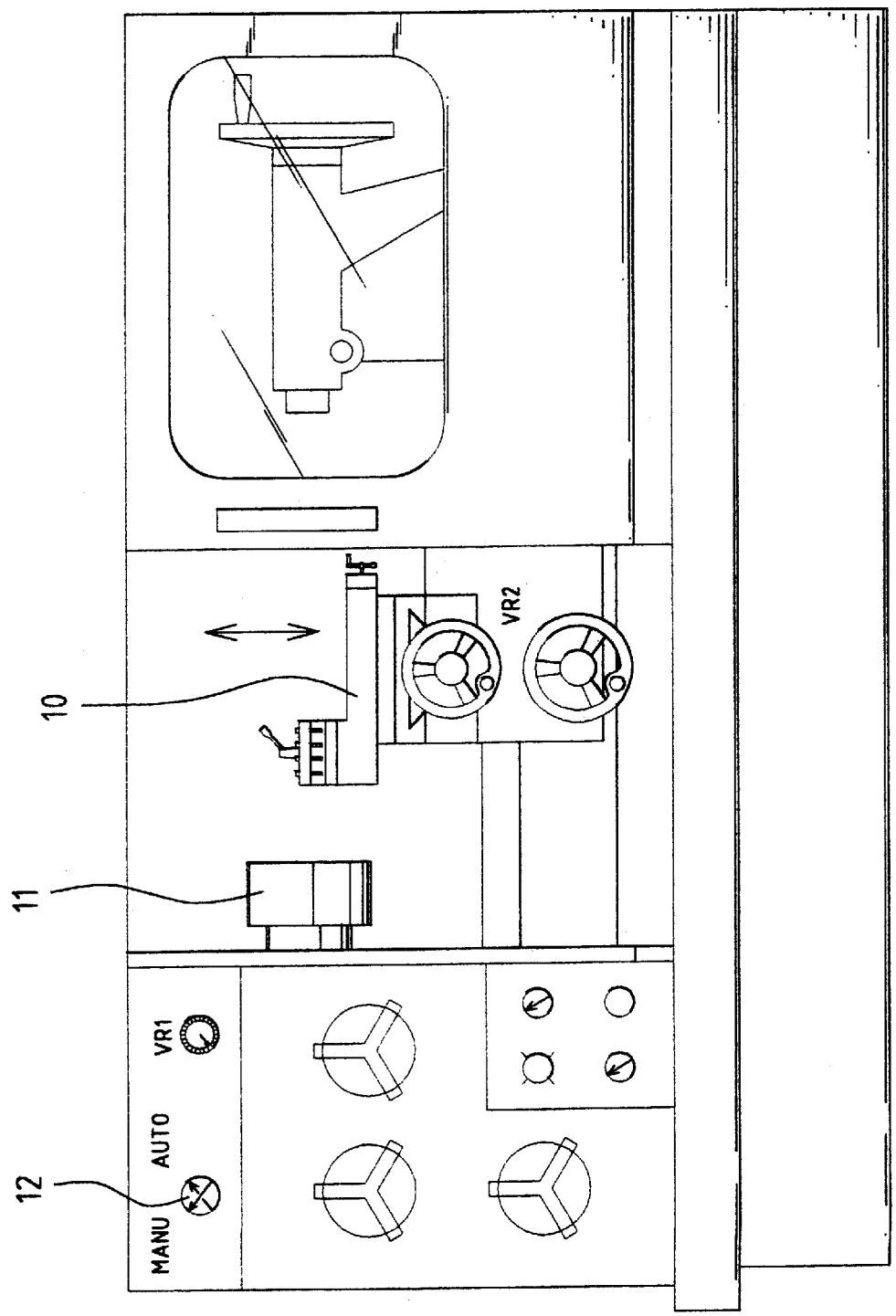
FIG. 1 is a side view of a lathe in accordance with the present invention.
Figure 2:
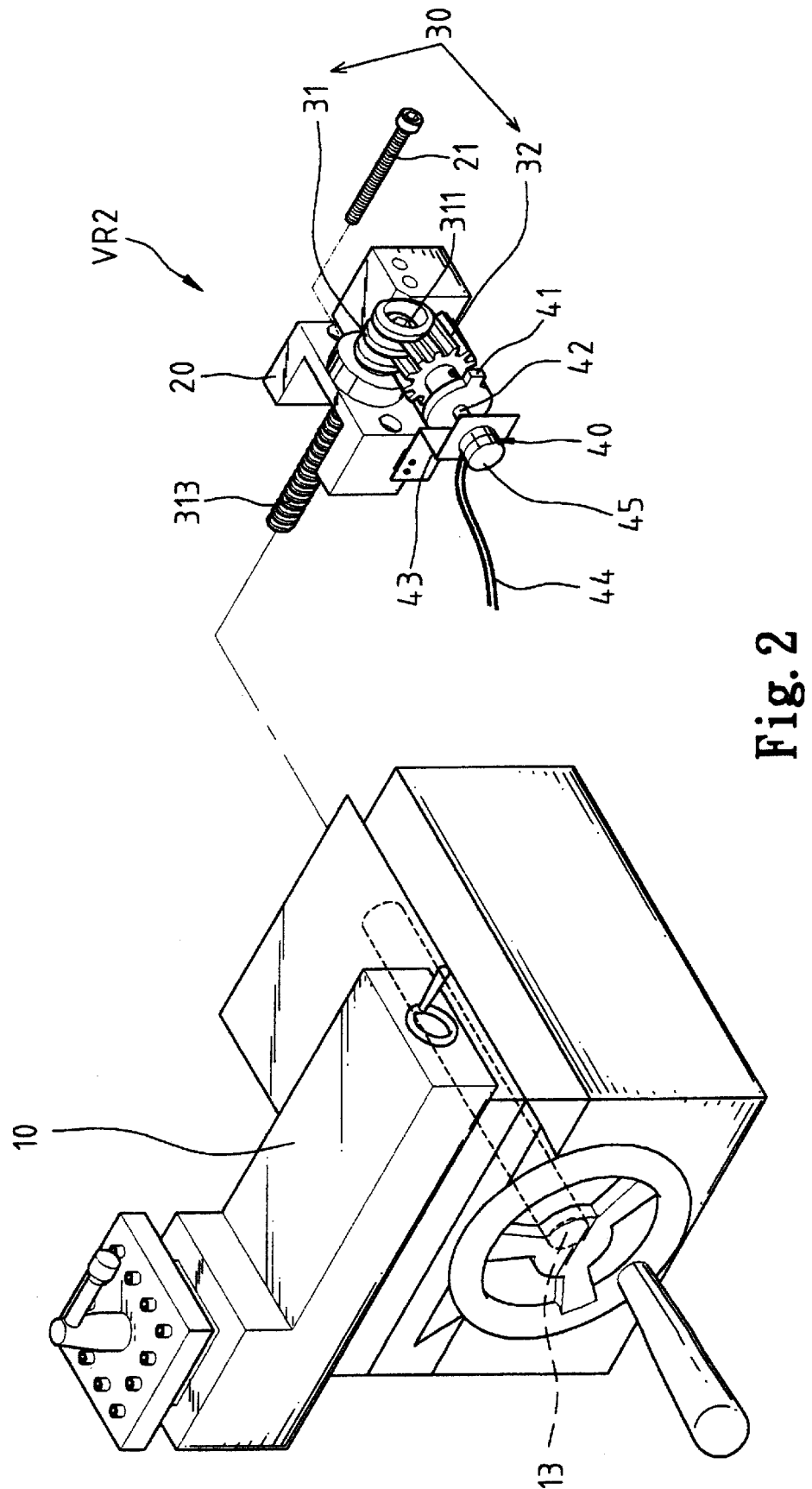
FIG. 2 is a perspective view of a stepless cutter feeding mechanism for the lathe in accordance with the present invention.

Referring to FIGS. 1 through 7 and initially to FIGS. 1 and 2, a stepless cutter feeding mechanism in accordance with the present invention is provided on a lathe that generally includes a knob VR1 for adjusting rotational speed of a main shaft 11 that is actuated by a main motor (not shown) and that carries a workpiece (e.g., a shaft) to be processed. The stepless cutter feeding mechanism includes a speed control device VR2 mounted behind a cutter seat 10 that carries a cutter (not shown) for processing the workpiece. The speed control device VR2 is designed to adjust rotational speed of the main shaft 11, which will be described in detail later.

The lathe further includes a switch device 12 that includes two modes: a manual mode (MANU) and an automatic mode (AUTO) which allows adjustment in rotational speed of the main shaft 11 by means of manual operation (by turning the knob VR1) or by automatic operation (under control of the speed control device VR2).

Figure 3:
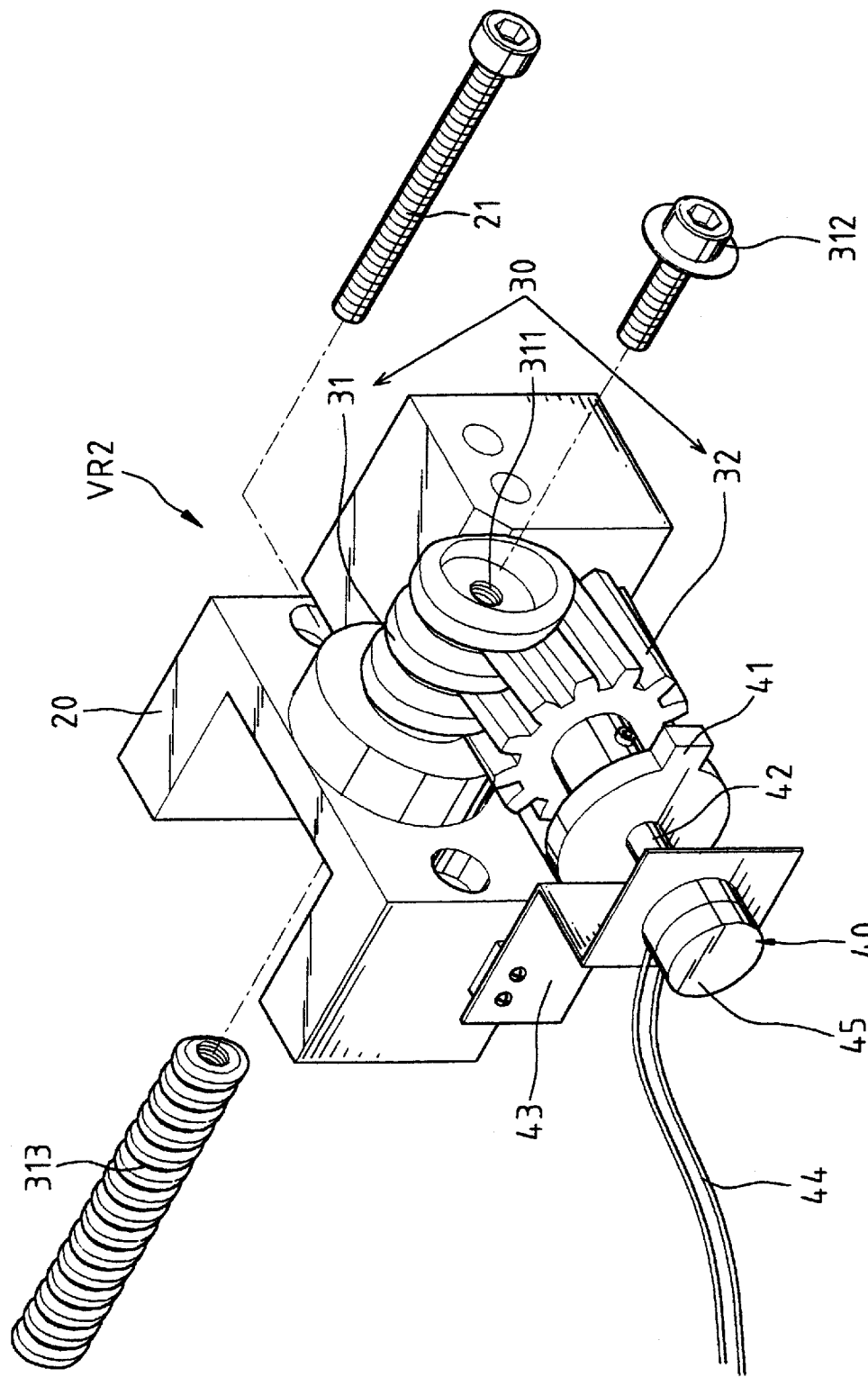
FIG. 3 is an exploded perspective view, at an enlarged scale, of a portion of the stepless cutter feeding mechanism in accordance with the present invention.
Figure 4:
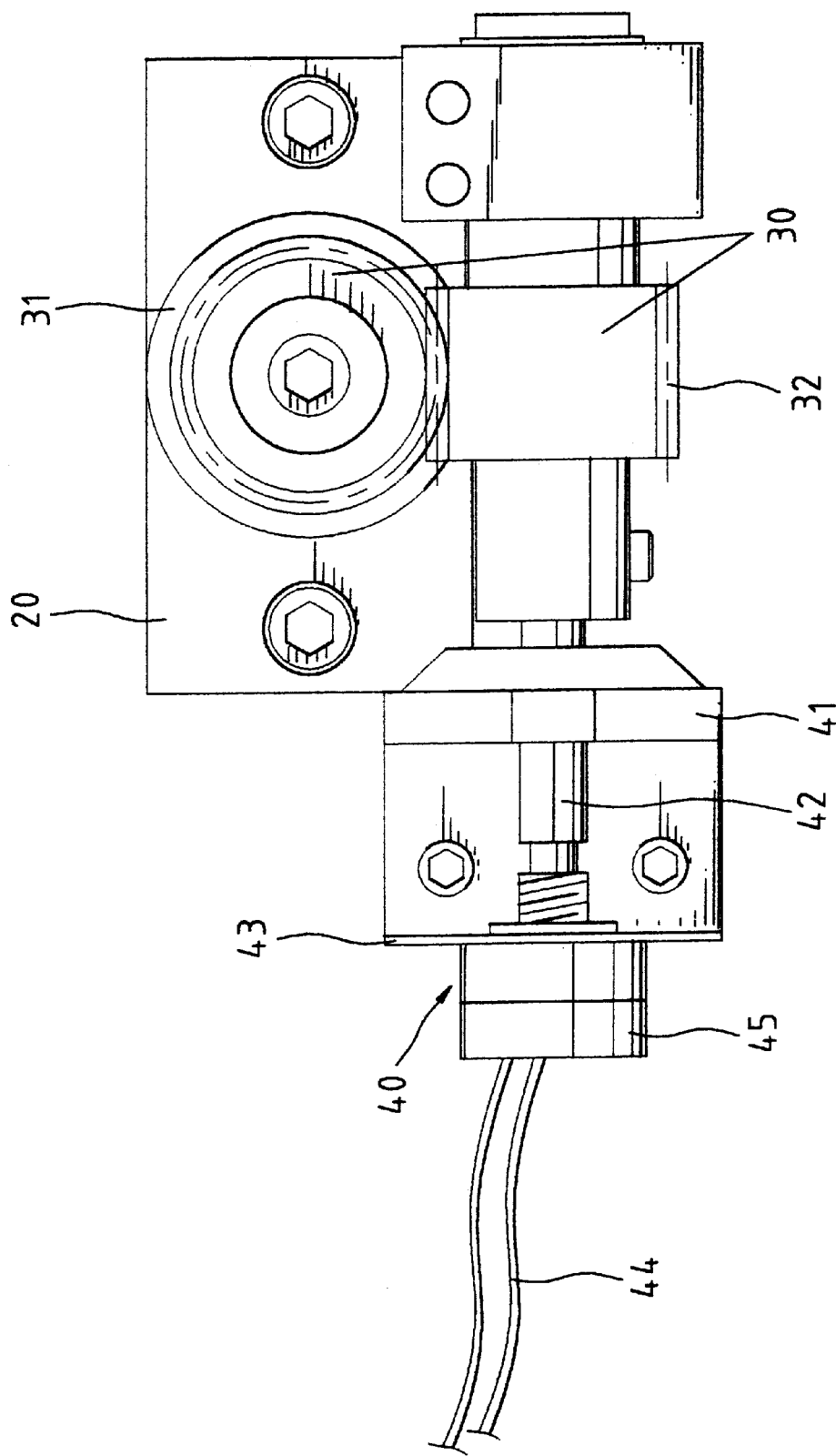
FIG. 4 is a front view of the portion of the stepless cutter feeding mechanism in FIG. 3.
Figure 5:
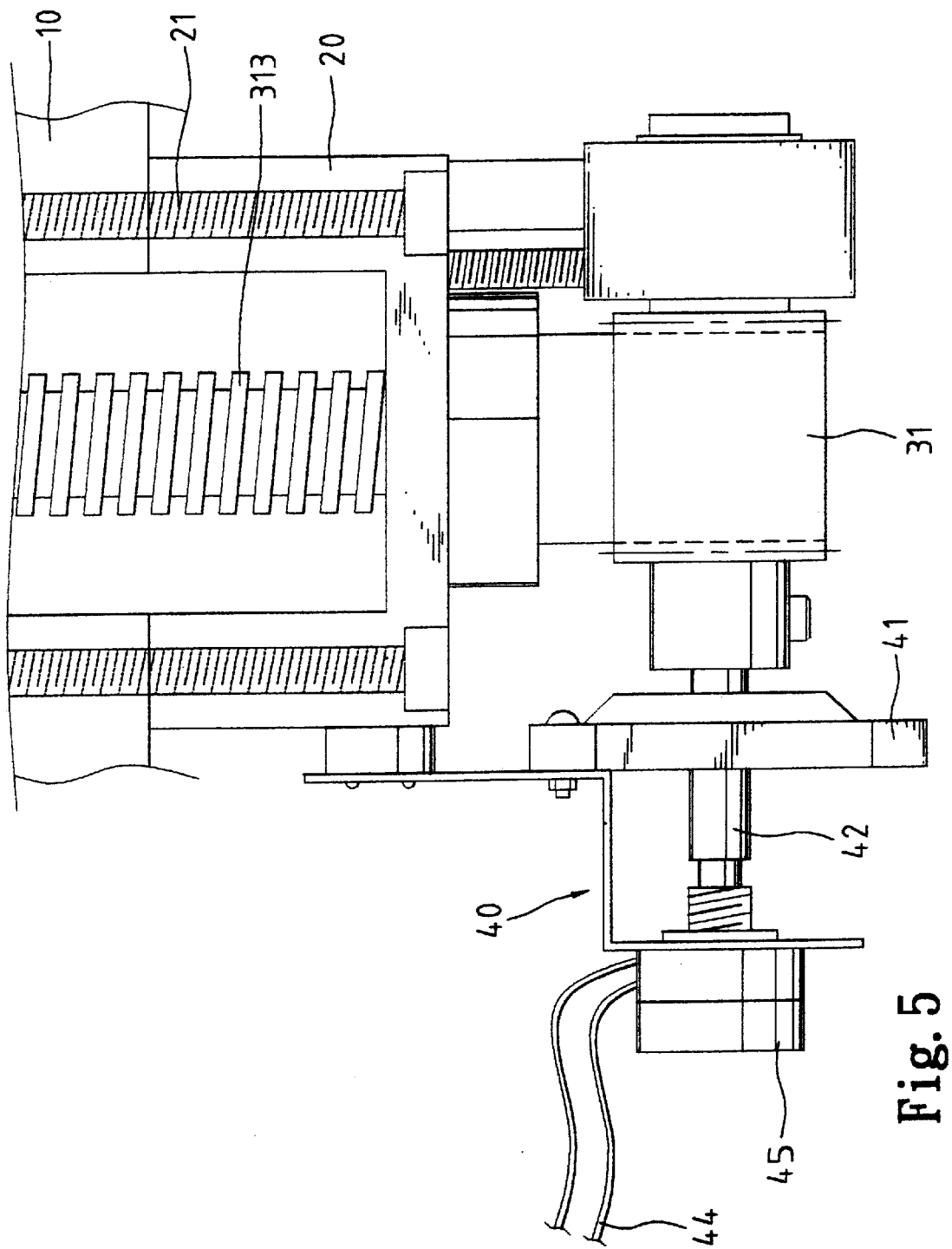
FIG. 5 is a top view of the portion of the stepless cutter feeding mechanism in FIG. 4.
Figure 7:
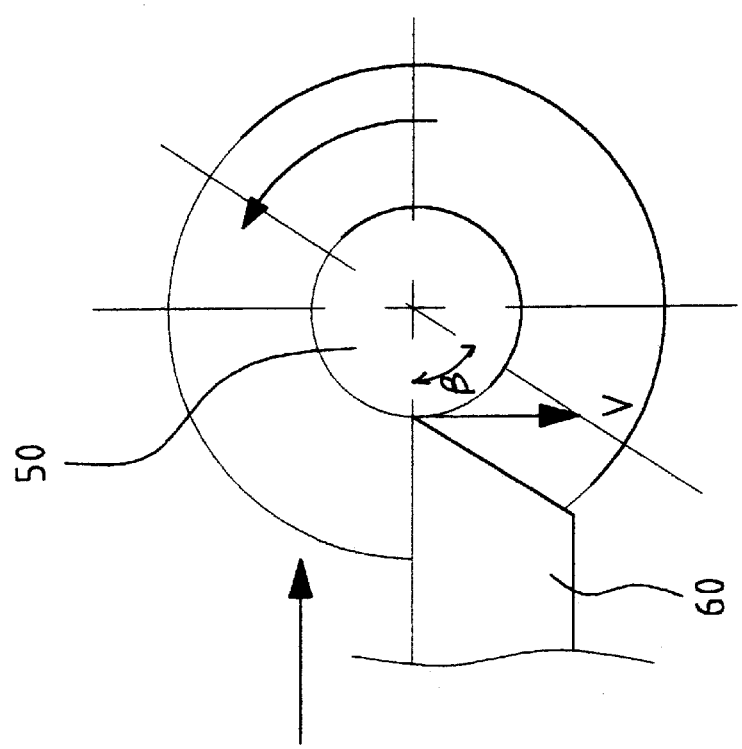
FIG. 7 is a schematic view illustrating cutting of the shaft by the cutter of the stepless cutter feeding mechanism in accordance with the present invention, wherein diameter of the shaft becomes smaller yet the linear cutting speed remains constant.

Referring to FIGS. 2 through 5, the speed control device VR2 includes a fixed seat 20 that is secured to the cutter seat 10 by screws 21 (FIG. 5), a speed sensing means 30, and a governor device 40. The speed sensing means 30 includes a worm 31 and a worm gear 32 that meshes with the worm 31. Alternatively, the worm/worm gear arrangement can be replaced by a larger gear/smaller gear arrangement. The governor device 40 includes a governor 41 that is coaxial with the worm gear 32, a transmission axle 42 that is connected to the governor 41 to rotate therewith, a resistor means 45 that is electrically connected to the motor (not shown) that drives the main shaft 11. The transmission axle 42 is secured between a bracket 43 and the governor 41 (FIGS. 3 and 4).

Referring to FIG. 3, a screw rod 313 is secured in an axial receptacle 311 defined in the worm 31 by a screw 312. An end of the screw rod 313 meshes with a transverse feeding shaft 13 of the cutter seat 10 such that a change in the linear cutter feeding speed during processing of the workpiece is immediately transmitted to the governor 41 via the worm 31 and worm gear 32. The change is then transmitted to the resistor means 45 via the transmitting axle 42. Responsive to the change in the linear cutter feeding speed, the resistor means 45 changes the frequency output to change the rotating speed of the motor via the cable 44.

Figure 6:
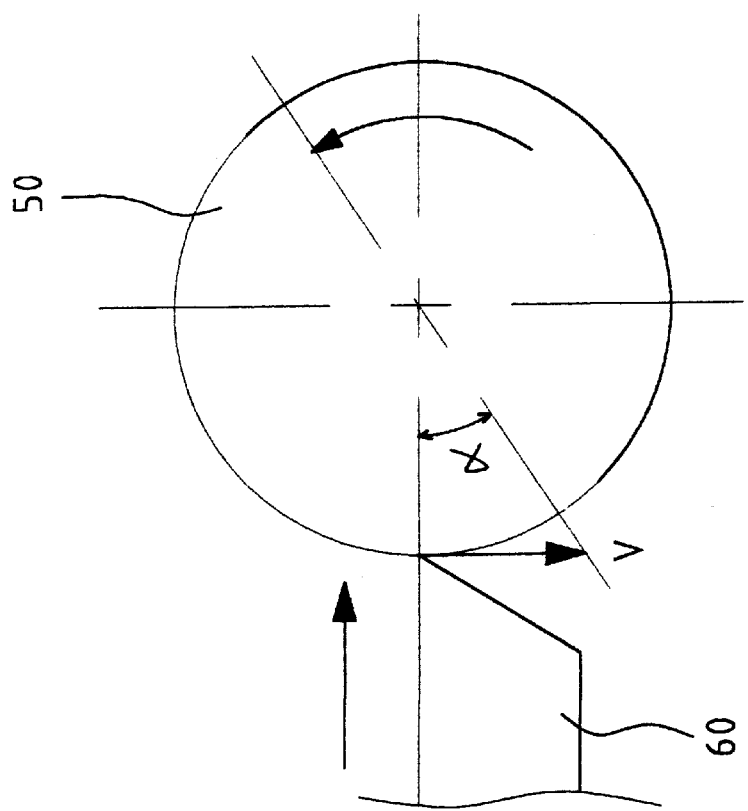
FIG. 6 is a schematic view illustrating cutting of a shaft by a cutter of the stepless cutter feeding mechanism in accordance with the present invention.
Figure 9:
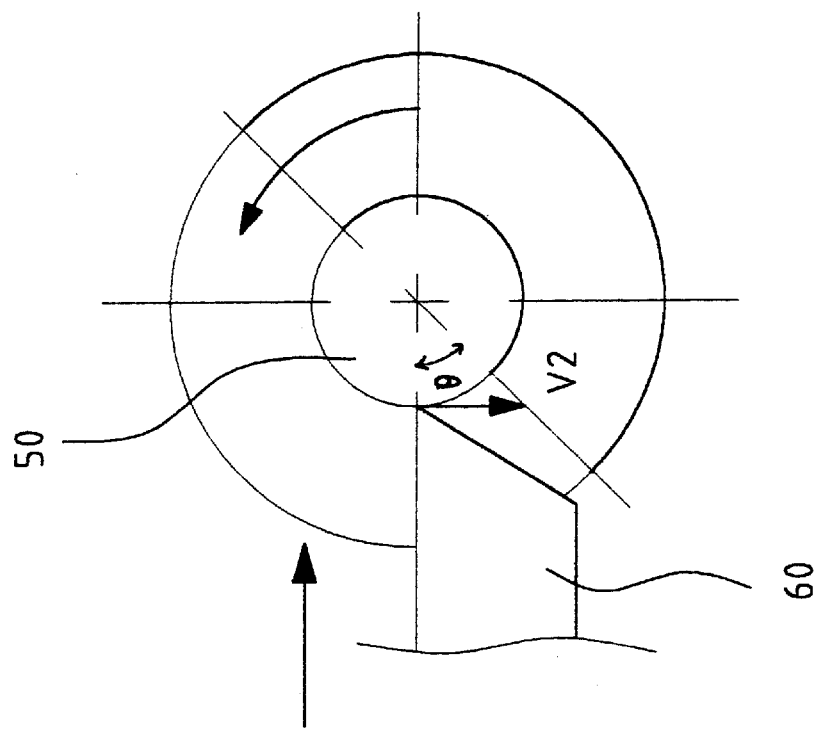
FIG. 9 is a schematic view illustrating cutting of the shaft by the cutter of the conventional cutter feeding device, wherein diameter of the shaft becomes smaller and the linear cutting speed becomes lower.
Figure 8:
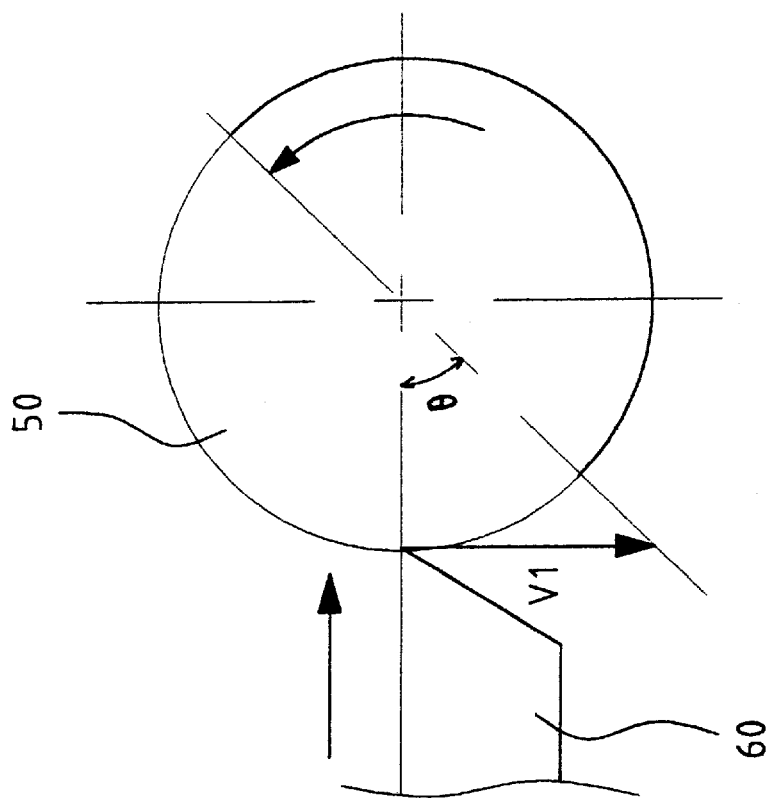
FIG. 8 is a schematic view illustrating cutting of a shaft by a cutter of a conventional cutter feeding device.

The motor drives not only the main shaft 11 that carries the workpiece but also the transverse feeding shaft 13 of the cutter seat 10. Referring to FIG. 6, when the cutter 60 on the cutter seat 10 is feed to cut the workpiece 50 that has traveled through an angle α, the linear cutting speed (the peripheral displacement per minute of the cutter along a circumference of the workpiece) is V. When the diameter of the workpiece 50 becomes smaller after a period of time, the linear cutting speed is reduced. Nevertheless, the rotating speed of the main shaft that carries the workpiece 50 is increased while the cutter feeding speed is also increased by means of provision of the speed control device VR2, as mentioned in the above paragraph. As a result, the workpiece 50 is traveled through a larger angle β within the same time such that the linear cutting speed still remains at the valve V. Thus, the linear cutting speed throughout the cutting process remains unchanged to provide a product of good quality.

Although the invention has been explained in relation to its preferred embodiment, it is to be understood that many other possible modifications and variations can be made without departing from the spirit and scope of the invention as hereinafter claimed.

I what is claimed is:

1. A lathe having a stepless cutter feeding mechanism for cutting a workpiece at a constant linear cutting speed, the lathe including a cutter seat that carries a cutter for cutting the workpiece and a motor for driving a main shaft that carries the workpiece, the lathe further including a transverse feeding shaft to which the cutter seat is mounted for feeding the cutter along a transverse direction, the stepless cutter feeding mechanism comprising:

a speed sensing means connected to the cutter for sensing linear cutting speed of the cutter, and a governor device connected to the speed sensing means and electrically connected to the motor for changing rotational speed of the motor in response to a linear cutter feeding speed of the cutter such that the cutter cuts the workpiece at a constant linear cutting speed;

the speed sensing means including a worm and a worm gear meshed with the worm, the worm being meshed with the transverse feeding shaft, the worm gear being connected to the governor device the worm including an axial receptacle, a screw being securely mounted in the axial receptacle to move therewith, the screw being meshed with the transverse feeding shaft;

the governor device including a governor coaxially mounted with the worm gear and a resistor means connected between the governor and the motor, the resistor means changing rotational speed of the motor in response to the change in the linear cutting speed of the cutter.

2. The lathe as claimed in claim 1, wherein the worm includes an axial receptacle, a screw being securely mounted in the axial receptacle to move therewith, the screw being meshed with the transverse feeding shaft.

3. The lathe as claimed in claim 1, wherein the lathe further comprises a switch device that includes a manual mode and an automatic mode thereby allowing adjustment in rotational speed of the main shaft by means of manual operation and by automatic operation under control of the governor device.

* * * * *